(12) United States Patent
Shinde et al.

(10) Patent No.: US 12,510,005 B2
(45) Date of Patent: Dec. 30, 2025

(54) METHODS AND APPARATUS FOR HEATING MOUNT LUGS

(71) Applicant: General Electric Company, Schenectady, NY (US)

(72) Inventors: Kudum Shinde, Bengaluru (IN); Mahesh Khandeparker, Bengaluru (IN)

(73) Assignee: General Electric Company, Evendale, OH (US)

( * ) Notice: Subject to any disclaimer, the term of this patent is extended or adjusted under 35 U.S.C. 154(b) by 213 days.

(21) Appl. No.: 18/062,977

(22) Filed: Dec. 7, 2022

(65) Prior Publication Data

US 2024/0067349 A1   Feb. 29, 2024

(30) Foreign Application Priority Data

Aug. 31, 2022 (IN) .............................. 202211049770

(51) Int. Cl.
| | |
|---|---|
| *F01D 25/28* | (2006.01) |
| *B64D 27/40* | (2024.01) |
| *F01D 11/24* | (2006.01) |
| *F01D 25/24* | (2006.01) |
| *F02C 7/20* | (2006.01) |
| *H05B 6/10* | (2006.01) |

(52) U.S. Cl.
CPC .............. *F01D 25/28* (2013.01); *B64D 27/40* (2024.01); *F01D 11/24* (2013.01); *F01D 25/246* (2013.01); *F02C 7/20* (2013.01); *H05B 6/101* (2013.01)

(58) Field of Classification Search
CPC ........... B64D 27/40–406; F01D 25/162; F01D 25/246; F01D 25/28; F02C 7/20
See application file for complete search history.

(56) References Cited

U.S. PATENT DOCUMENTS

| | | | |
|---|---|---|---|
| 785,922 | A | 3/1905 | Termaat et al. |
| 4,482,293 | A * | 11/1984 | Perry .................. F02C 7/20 415/113 |
| 4,875,828 | A * | 10/1989 | Willkop ............ F01D 25/246 415/177 |
| 4,943,013 | A | 7/1990 | Kapala et al. |
| 5,259,183 | A | 11/1993 | Debeneix |
| 9,027,876 | B2 | 5/2015 | Durand et al. |
| 9,394,057 | B2 | 7/2016 | Guillou |
| 10,131,449 | B2 | 11/2018 | Strobl et al. |
| 2006/0193721 | A1* | 8/2006 | Adam ................. F01D 25/145 415/177 |
| 2013/0330167 | A1* | 12/2013 | Rioux .................. F02C 9/00 415/1 |
| 2014/0077027 | A1 | 3/2014 | Durand et al. |
| 2015/0175268 | A1 | 6/2015 | Guillou |
| 2015/0183530 | A1 | 7/2015 | Strobl et al. |

(Continued)

FOREIGN PATENT DOCUMENTS

GB         1247071         9/1971

*Primary Examiner* — Gerald L Sung
*Assistant Examiner* — Rene D Ford
(74) *Attorney, Agent, or Firm* — Hanley, Flight & Zimmerman, LLC

(57) ABSTRACT

Example engine apparatus and associated control methods are disclosed. An example engine apparatus includes: a frame; a lug to attach the frame to an aircraft; a mount cover positioned over the lug; and a heating mechanism to regulate a temperature of the lug under the mount cover.

12 Claims, 16 Drawing Sheets

(56) References Cited

U.S. PATENT DOCUMENTS

2017/0106989 A1* 4/2017 Takeuchi ............. B64D 27/402
2019/0202573 A1* 7/2019 Pautis .................... B64D 27/40
2020/0062375 A1 2/2020 Connelly et al.

* cited by examiner

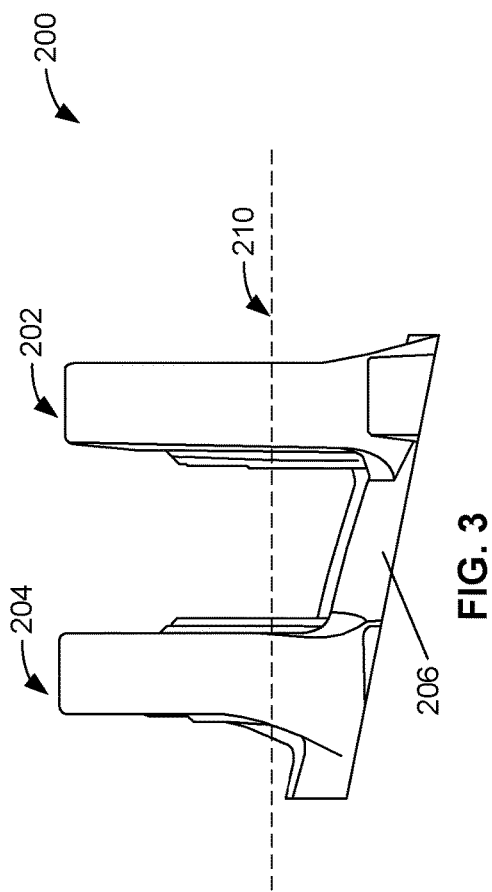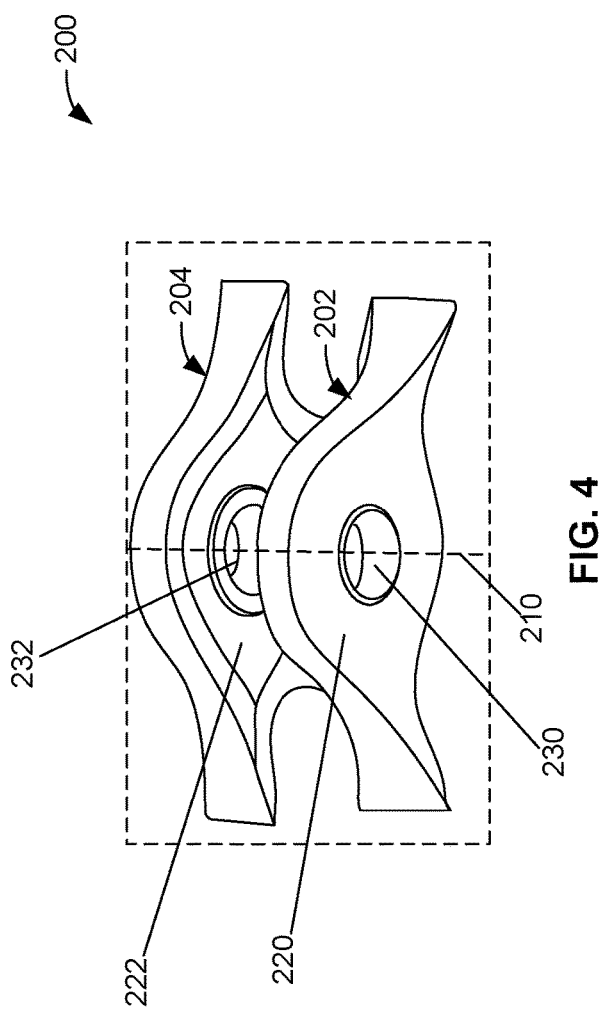

METHODS AND APPARATUS FOR HEATING MOUNT LUGS

RELATED APPLICATION

This patent claims the benefit of Indian Provisional Patent Application No. 202211049770, which was filed on Aug. 31, 2022. Indian Provisional Patent Application No. 202211049770 is hereby incorporated herein by reference in its entirety. Priority to Indian Provisional Patent Application No. 202211049770 is hereby claimed.

FIELD OF THE DISCLOSURE

This disclosure relates generally to an engine mount and, more particularly, to methods and apparatus for heating an engine mount.

BACKGROUND

Turbine engines are some of the most widely used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

All or part of a turbine engine is attached to an aircraft using lugs. For example, a frame can include one or more lugs to connect the engine to a pylon of the aircraft.

BRIEF DESCRIPTION OF THE DRAWINGS

FIG. 3 shows a side view of a portion of the example apparatus of FIG. 2.

FIG. 4 illustrates another view of the arrangement of lugs of the example apparatus of FIG. 2.

In general, the same reference numbers will be used throughout the drawing(s) and accompanying written description to refer to the same or like parts. The figures are not to scale.

Figure 1:
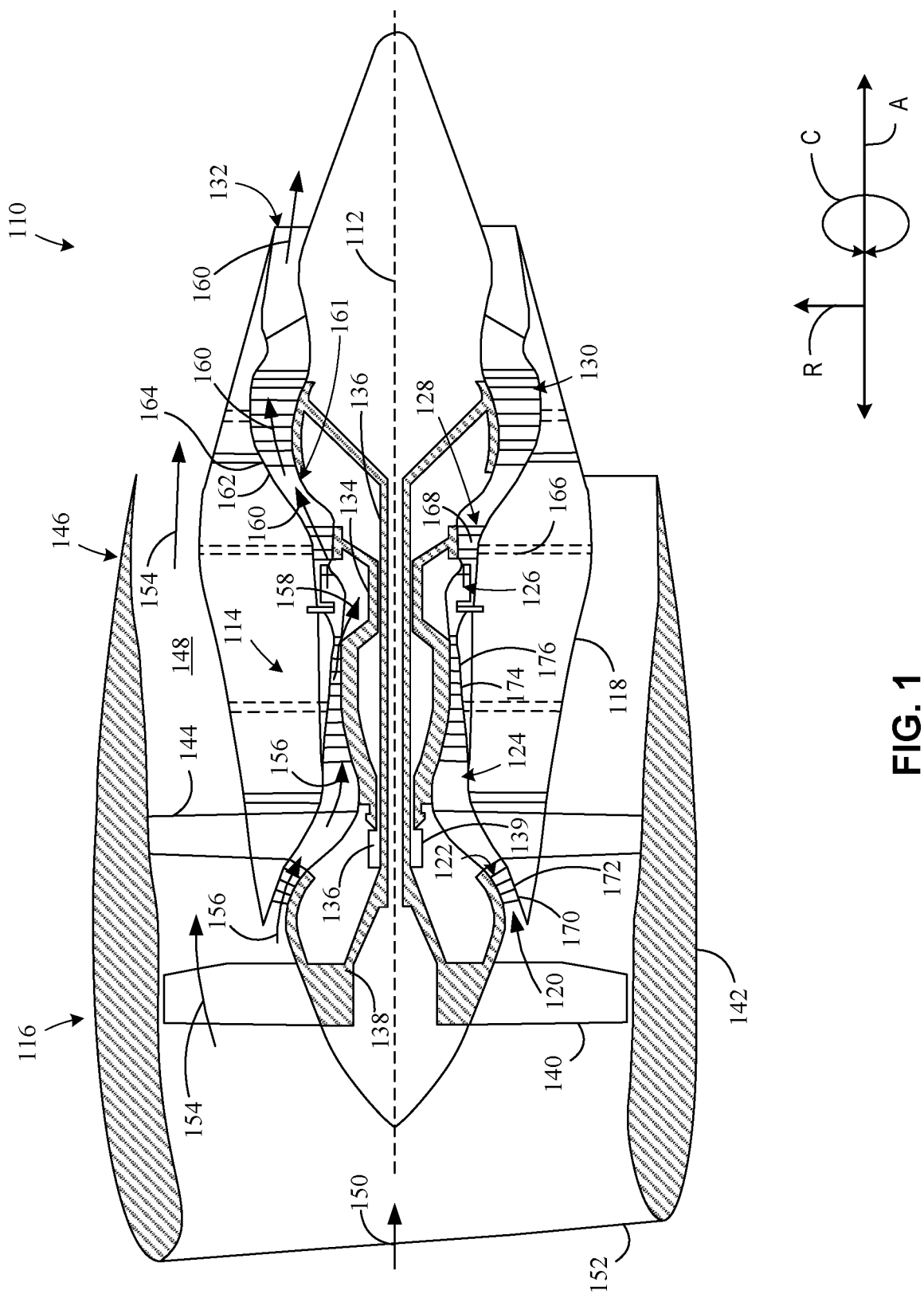
FIG. 1 is a schematic cross-sectional view of an example high-bypass turbofan-type gas turbine engine.

As used herein, unless otherwise stated, the term "above" describes the relationship of two parts relative to Earth. A first part is above a second part, if the second part is between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, joined, etc.) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., may be used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, when the phrase "at least" is used as the transition term in, for example, a preamble of a claim, it is open-ended in the same manner as the term "comprising" and "including" are open ended. The term "and/of" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

The terms "upstream" and "downstream" refer to the relative direction with respect to fluid flow in a fluid pathway. For example, "upstream" refers to the direction from which the fluid flows, and "downstream" refers to the direction to which the fluid flows. As may be used herein, "vertical" refers to the direction perpendicular to the ground. As may be used herein, "horizontal" refers to the direction parallel to the centerline of the gas turbine engine 100. As may be used herein, "lateral" refers to the direction perpendicular to the axial and vertical directions (e.g., into and out of the plane of FIGS. 1, 2, etc.).

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

One or more stages of an example engine, such as the example turbofan engine 110 of FIG. 1, can include lugs (not shown in the example of FIG. 1) to connect engine stages to each other and/or to connect the turbofan engine 110 to an aircraft (e.g., at a pylon, etc.) and/or other structure. For example, a turbine rear frame and/or other turbine frame (e.g., the turbine frame 161, etc.) can be mounted to an aircraft at a pylon, other support, fuselage, etc., using one or more lugs. Lugs are local features that create local cold spots on the frame. Cold areas can form on and/or around the lugs through air flow and/or other atmospheric conditions. For example, lugs can act as fins that direct airflow and create localized cold areas, also referred to as cold spots, on the turbine frame. Temperature variation such as these cold areas or "spots" can impact clearance and alignment.

Cold areas forming on the lugs and/or turbine frame can cause a distortion in the frame that can have a negative impact on airflow, engine alignment, clearance, etc. For example, cold spots on the turbine frame can cause a relative shift in a rotor-stator centerline. The shift of the centerline affects integrity of seals, for example. The shift of the centerline also affects a clearance between an engine blade tip and a surrounding shroud, for example. The shift of the centerline also causes challenges in air flow-path alignment, for example.

Certain examples help to reduce thermal gradients caused by the lugs. For example, a mount cover is provided to heat lugs using hot air and/or electric heating of the lug to reduce or eliminate cold spots on the turbine frame. In certain examples, the mount cover also insulates the lugs from undercowl colder air, and, through such insulation, reduces thermal gradient. Reduction in cold spots and thermal gradient helps improve seal/tip clearances, flow path alignment, etc.

In certain examples, the mount cover forms an outer barrier around the lugs through which a hot flowpath air intake is created. The flow of hot or warm air prevents cold airs from forming on the lugs and/or associated frame. In other examples, one or more electric heating coils are positioned between the mount cover and the lugs, and the heat generated by the coil(s) prevents formation of cold spots on the lugs. In other examples, the mount cover forms a heat shield with spacing between the heat shield and the lugs. The spacing forms an air pocket around the lugs to insulate the lugs from a cold or changing temperature gradient. In other examples, insulating material (e.g., foam, dielectric fluid, other insulator packaging, etc.) is positioned around the lugs to form the insulating mount cover and prevent or reduce cold spots from forming on the lugs.

Figure 2:
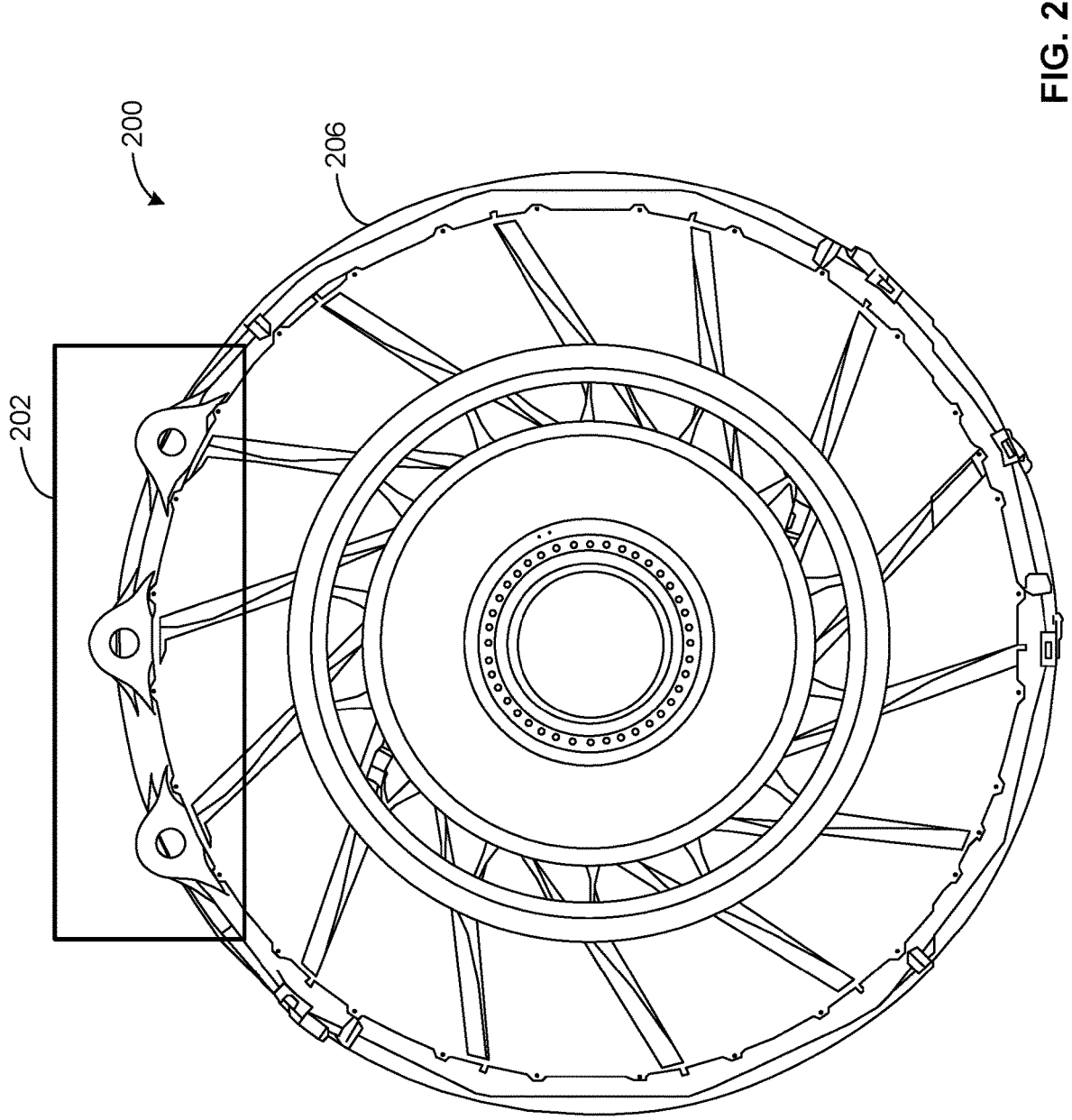
FIG. 2 shows an example turbine frame apparatus to support an engine such as the engine of FIG. 1 and attach the engine to another structure.

FIG. 2 shows an example turbine frame apparatus 200 including a plurality of mounting lugs 202 on a frame 206 (e.g., a turbine rear frame, a turbine forward frame, another turbine frame, the example turbine frame 161, etc.) including a plurality of mounting lugs 202. As illustrated in the example turbine frame apparatus 200 of FIG. 2, one or more of the mounting lugs 202 can be used to attach the frame 206 to an aircraft and/or other apparatus (e.g., at a pylon, fuselage, other structure, etc.). While not visible in the view of FIG. 2, mounting lugs are typically arranged in a pair 202, 204 (see FIGS. 3 and 4) such that a bolt, rod, screw, shaft, etc., can be inserted through the pair of lugs 202, 204.

While FIG. 2 shows a front view of the example turbine frame apparatus 200, in which a first lug 202 of a pair is visible but a second lug 204 of the pair is not visible, FIG. 3 shows a side view of the example turbine frame apparatus 200 including the pair of lugs 202, 204 on the example turbine frame 206. In the example of FIG. 3, the lugs 202, 204 are arranged at an angle or staggered with respect to each other on the circumference of the frame 206, with a passage indicated by reference line 210 extending through an opening in each lug 202, 204. The passage 210 allows an object, such as a bolt, rod, screw, shaft, etc., to be inserted through both lugs 202, 204 as well as a corresponding lug or attachment point (not shown in the view of FIG. 3) located on the aircraft and/or other structure to which the example turbine frame apparatus 200 is to be mounted.

FIG. 4 illustrates another view of the arrangement of lugs 202, 204 of the example turbine frame apparatus 200 shown in FIG. 3. As shown in the example of FIG. 4, each lug 202, 204 has a body 220, 222 and an opening 230, 232 within the body 220, 222 through which the passage 210 aligns the lugs 202, 204 along the curvature of an outer edge of the frame 206.

Figure 5:
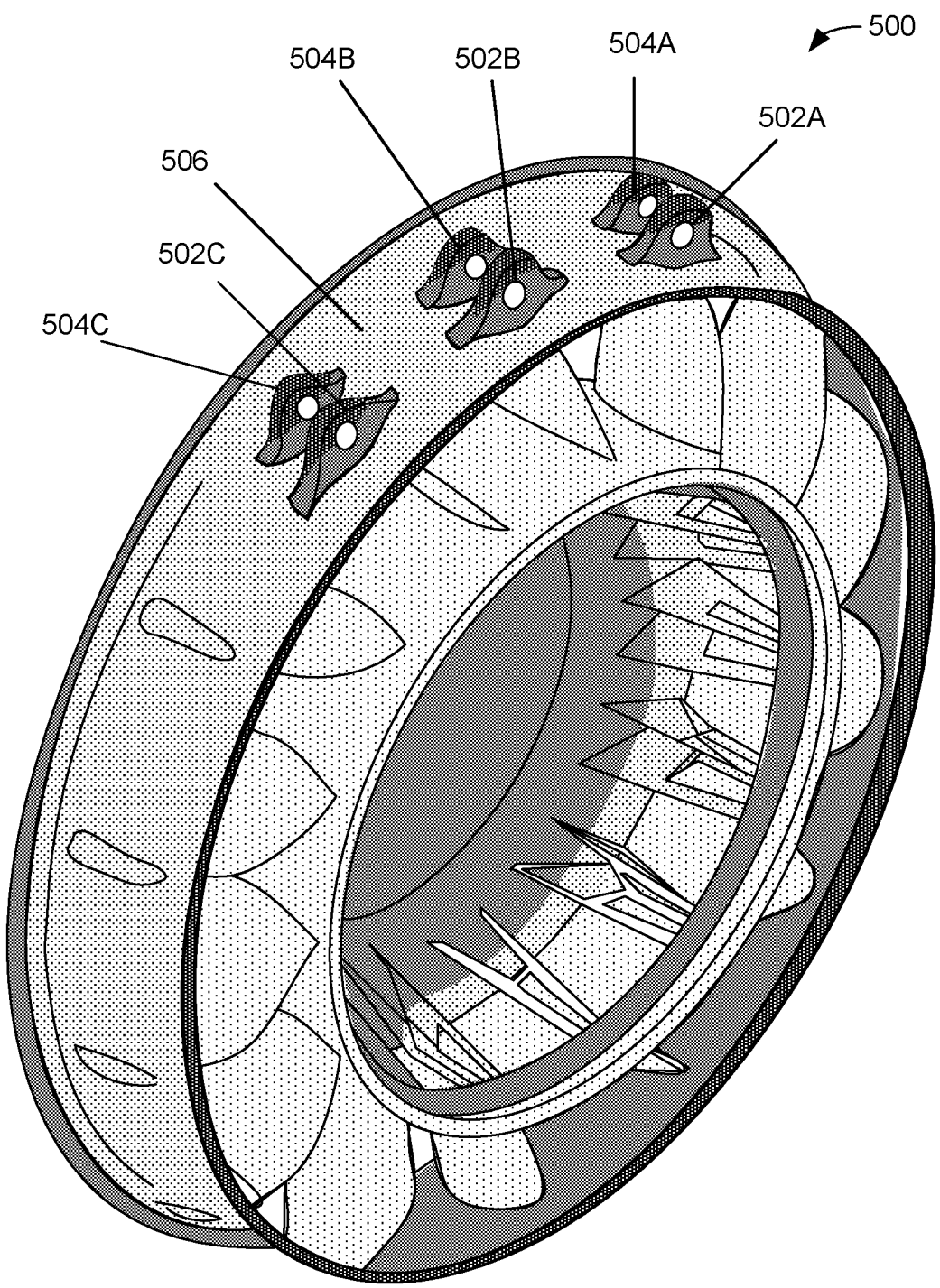
FIG. 5 illustrates an arrangement of three sets of lugs on a frame of an example apparatus.

FIG. 5 illustrates an arrangement of three sets of lugs 502A-502C, 504A-504C on a frame 506 of an example apparatus 500. The example apparatus 500 of FIG. 5 may be similar to the example turbine frame apparatus 200 of FIGS. 2-4. The example pairs of lugs 502A-502C, 504A-504C may be similar to the pair of lugs 202, 204 of the examples of FIGS. 2-4. A turbine engine is connected to the frame 506. One or more of the pairs of lugs 502A-502C, 504A-504C can be used to mount the frame 506 to an aircraft or other structure, for example.

Figure 6:
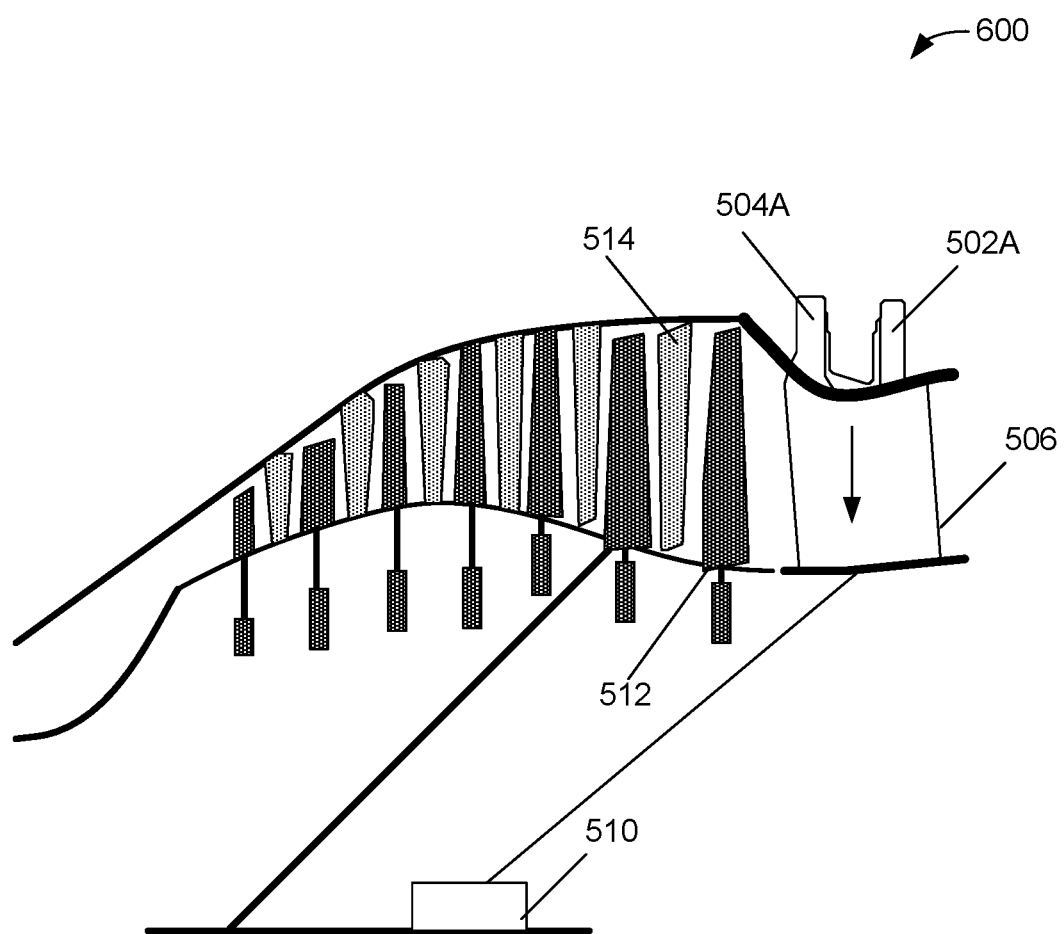
FIG. 6 illustrates an example engine in which, when the lugs are cold, the turbine rear frame moves with respect to a bearing to which the turbine rear frame is attached.

FIG. 6 illustrates an example engine 600 in which, when the lugs 502A, 504A are cold, the turbine frame 506, illustrated as a rear turbine frame, moves with respect to a bearing 510 (e.g., a cylindrical roller bearing, radial rolling bearing, etc.) to which the turbine frame 506 is attached. As such, a rotor 512 moves with respect to a stator 514 of the low-pressure turbine (LPT), for example. For example, due to non-uniform temperature, the rotor 512 moves to touch the bottom half of the stator 514 and creating more open clearances thru the 3 o'clock position.

Figure 7:
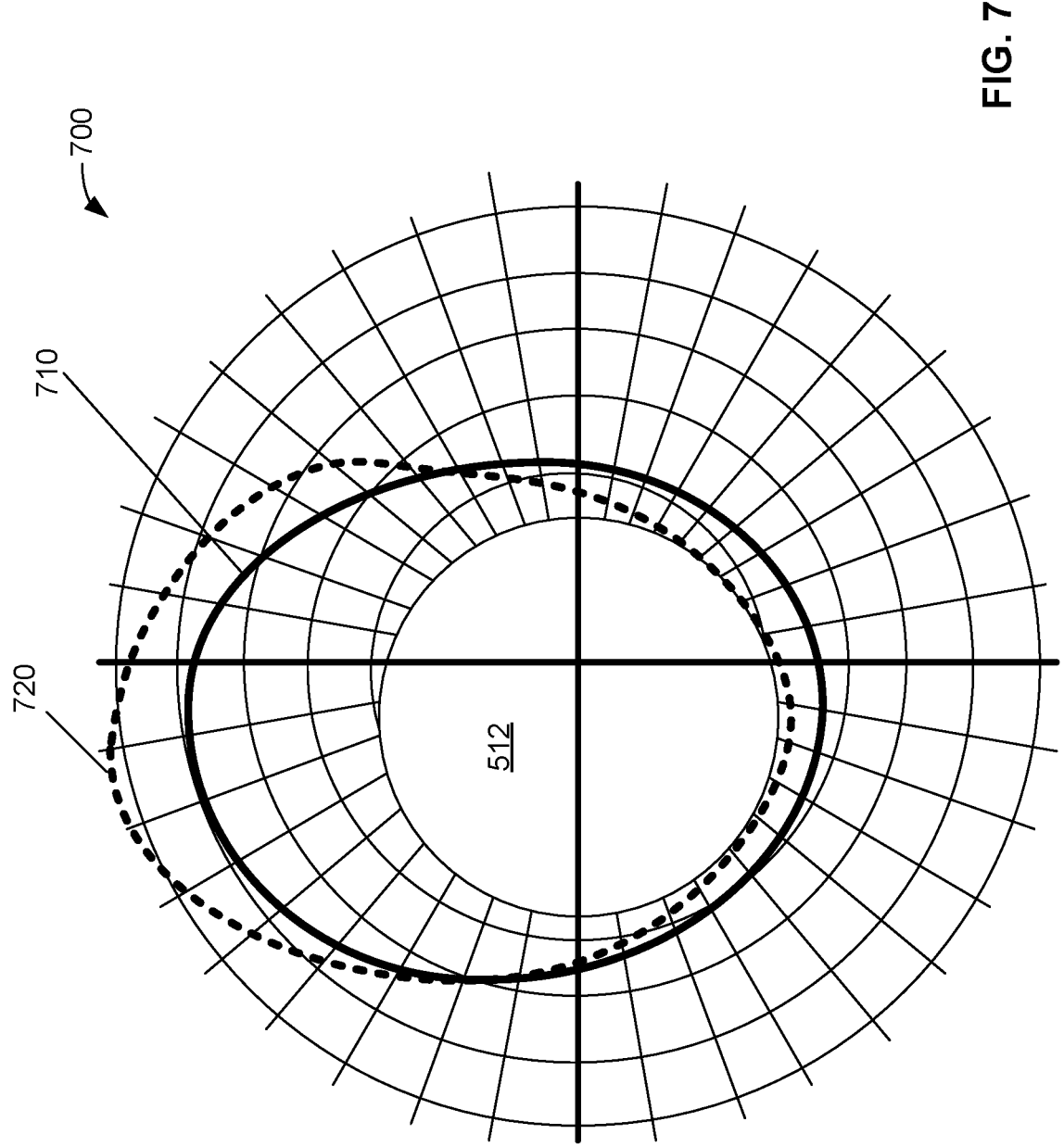
FIG. 7 shows a baseline plot of movement with respect to a deflected rotor when lugs are cold.
Figure 8:
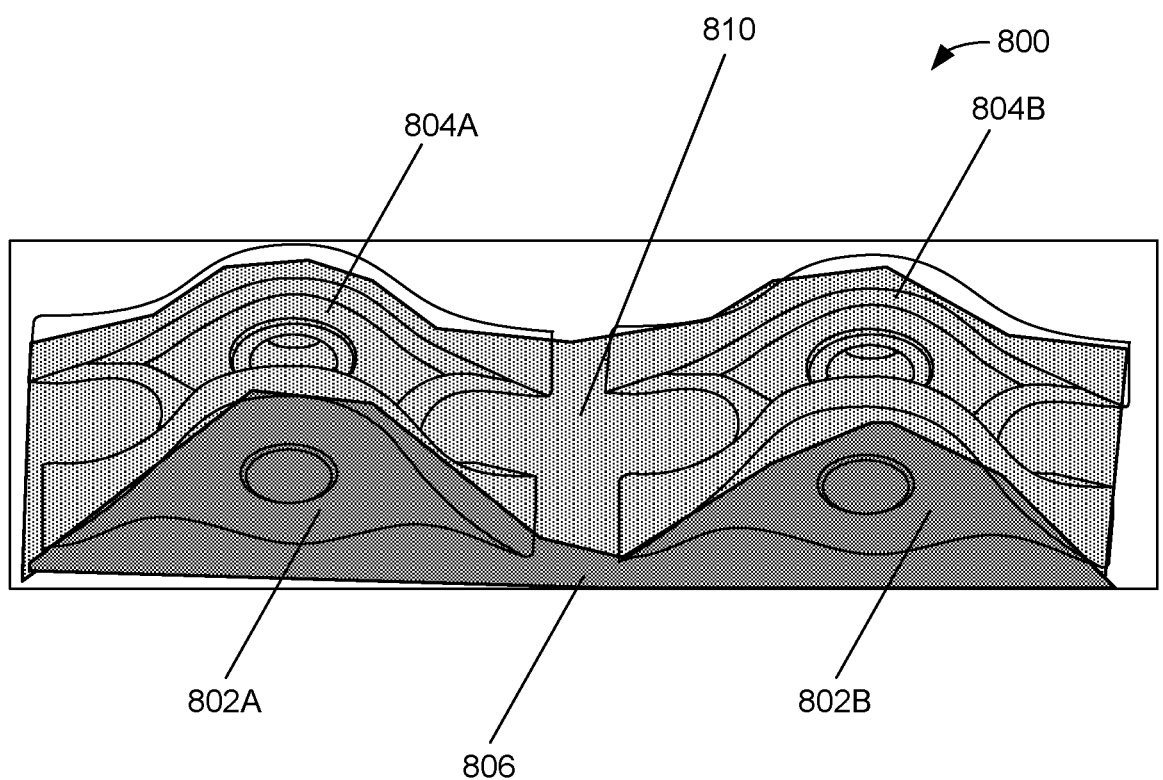
FIG. 8 illustrates an example apparatus including a mount cover or coating arranged over the lugs.

A polar plot 700 of FIG. 7 shows a baseline plot 710 of movement with respect to a deflected rotor 512 (FIG. 6) when lugs (not shown in this plot 700) are cold. An improved, alternative plot 720 shows reduced movement with respect to rotor 512 deflection, reducing pocket clearance and moving out a pinch point for the example engine apparatus.

To address the limitations of the lugs of FIGS. 2-6, FIG. 8 illustrates an example apparatus 800 including a mount cover or coating 810 arranged over lugs 802A-802B, 804A-804B, etc. The example mount cover 810 serves to protect (e.g., insulate, shield, etc.) the lugs 802A-802B, 804A-804B to reduce or eliminate cold spots forming on the lugs 802A-802B, 804A-804B and/or an associated frame 806. In certain examples, the mount cover 810 can be formed from a thermal barrier coating such as yttria-stabilized zicronia (YSZ), alumina, ceria ($CeO_2$), nickel-iron-cobalt alloy, ceramic-matrix composite (CMC) (e.g., fiber-reinforced silicon carbide (SiC)), etc.

In operation, under cowl air flows through the lugs 802A-802B, 804A-804B, which can result in the formation of cold spots or areas on the lugs 802A-802B, 804A-804B and/or the associated frame 806. The mount cover or coating 810 reduces a thermal gradient between the lugs 802A-802B, 804A-804B and a surrounding casing, which helps to align the rotor and stator. Otherwise, lugs running colder relative to the casing to which they are connected impacts alignment. Better alignment of the rotor and stator improves clearance between the blade and casing which improves performance. Without the mount cover 810, a shift in alignment between the rotor and stator occurs (e.g., as shown in the example of FIG. 6). The rotor shifts relative to a center line, which impacts clearance at seals as well as rotor-to-stator blade clearance, which poses alignment challenges.

Specific fuel consumption (SFC) can also be impacted by engine alignment. SFC is linked with blade tip clearances, for example. An air gap between a stator and a rotor creates a leakage path which increases SFC, making the engine less efficient. When blade tip clearance is impacted, fuel consumption is higher.

As is described further herein, the mount cover 810 is formed over the lugs 802A-802B, 804A-804B. For example, the mount cover 810 can be deposited, placed, fit, and/or otherwise positioned over the lugs 802A-802B, 804A-804B. In certain examples, the mount cover 810 extends over a portion of the frame 806 between the lugs 802A-802B, 804A-804B as well.

The mount cover 810 can be positioned over, adjacent to, and/or otherwise with respect to the lugs 802A-802B, 804A-804B in a variety of configurations. FIGS. 9-13 illustrate some example configurations of the mount cover 810 with respect to one or more of the lugs 802A-802B, 804A-804B.

Figure 9:
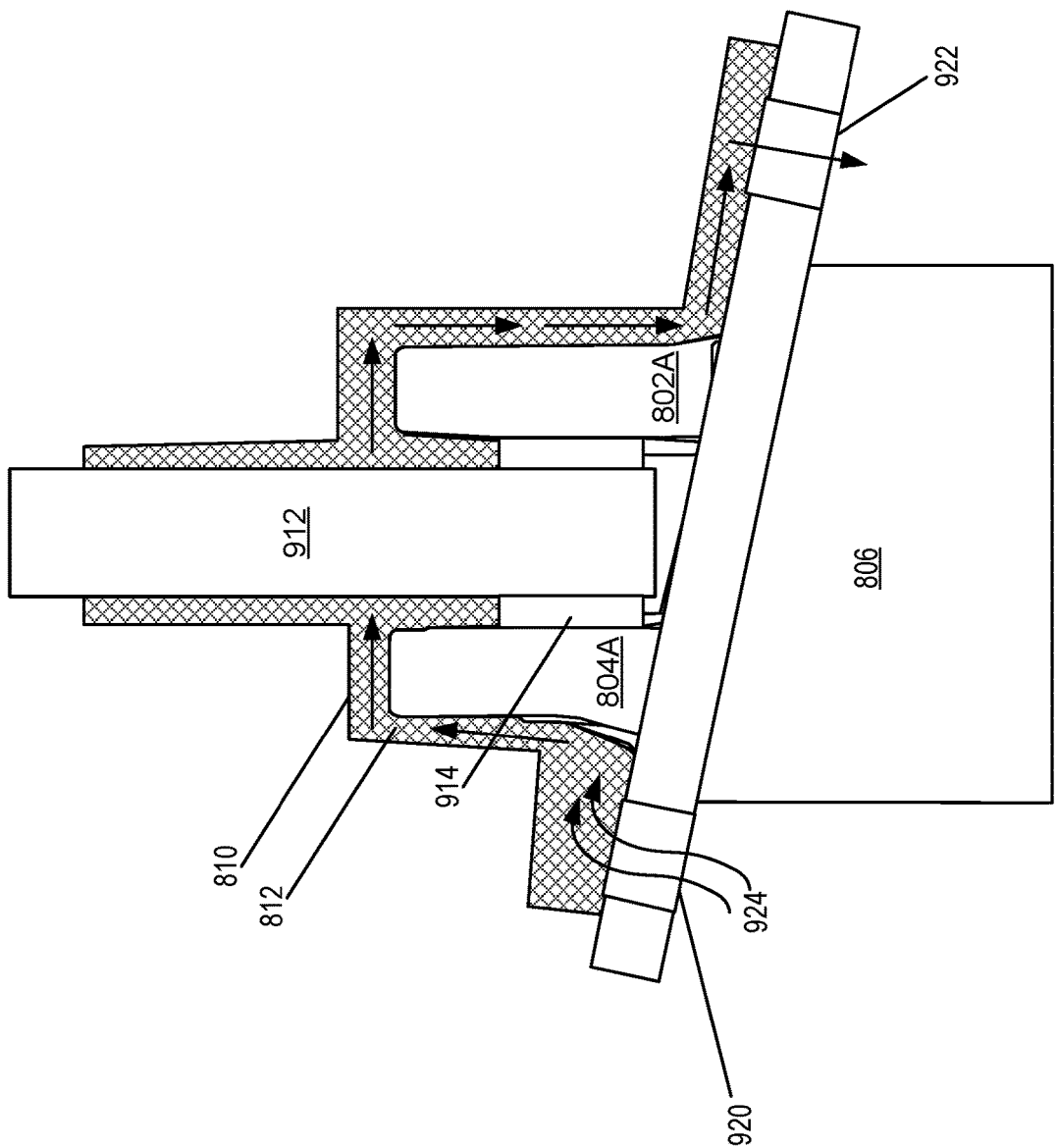
FIG. 9 illustrates an example configuration of the mount cover over lugs of FIG. 8.

As shown in the example of FIG. 9, the mount cover 810 is positioned over the lugs 802A, 804A and extends to cover a portion of an attachment point 912, as well as a bolt or shaft 914 that extends through the lugs 802A, 804A and the attachment point 912 to attach the frame 806 (e.g., the turbine rear frame, etc.) to another structure, such as a pylon, etc., attached to the attachment point 912.

In the example of FIG. 9, the mount cover 810 creates a cavity or passage 812 over the lugs 802A, 804A and through the attachment point 912 to allow an air flow through the passage 812. As shown in the example of FIG. 9, a pair of openings 920, 922 allows an air flow 924 (illustrated by arrows in FIG. 9) to travel under the mount cover 810 and over the lugs 802A, 804A through the attachment point 912. The air flow 924 can be a hot air intake, for example. The air flow 924 of hot air over the lugs 802A, 804A under the mount cover 810 helps prevent cold spots from forming on and/or near the lugs 802A, 804A, for example.

Figure 10:
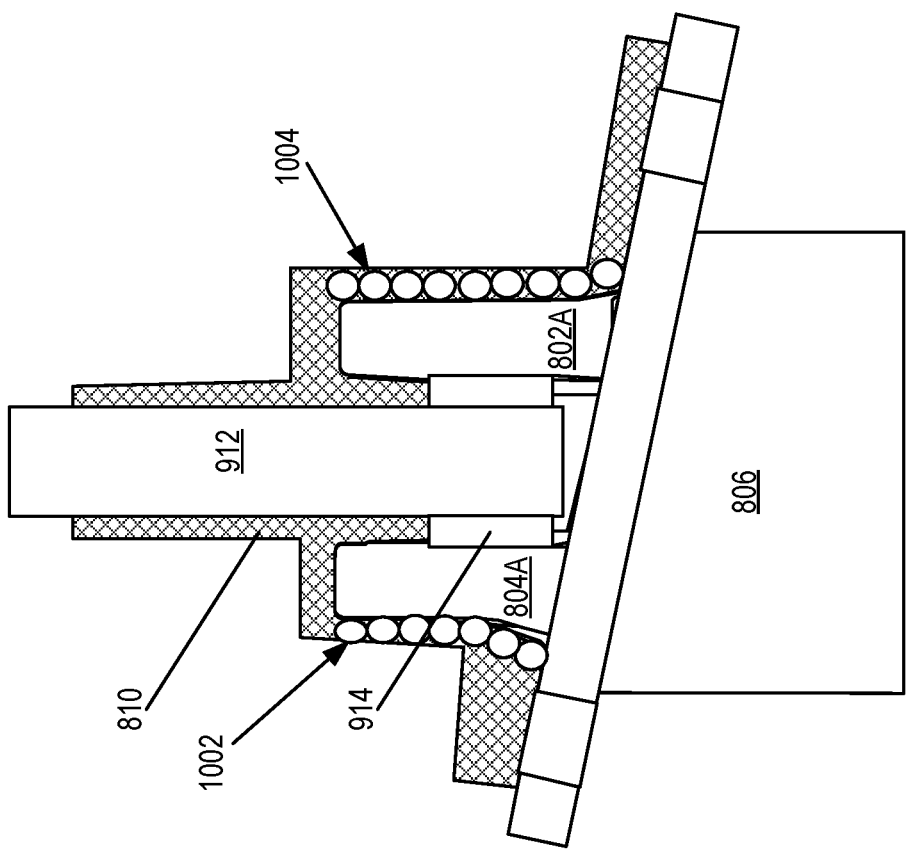
FIG. 10 illustrates an example configuration of the mount cover over lugs of FIG. 8 with heating elements.

FIG. 10 illustrates an alternative configuration of the mount cover 810. In the example of FIG. 10, the mount cover 810 is positioned over the lugs 802A, 804A and extends to cover a portion of an attachment point 912, as well as a bolt or shaft 914 that extends through the lugs 802A, 804A and the attachment point 912 to attach the frame 806 (e.g., the turbine rear frame, etc.) to another structure, such as a pylon, etc., attached to the attachment point 912. In the example configuration of FIG. 10, a plurality of heating coils and/or other heating elements 1002, 1004 (e.g., electric heating coils, etc.) are arranged inside/under the mount cover 810. As such, when an electric current and/or an electromagnetic field is applied to the heating elements 1002, 1004, heat is generated to warm the lugs 802A, 804A and/or air under the mount cover 810 surrounding the lugs 802A, 804A. Thus, the heating elements 1002, 1004 can directly and/or indirectly warm the lugs 802A, 804A to help prevent cold spots from forming on and/or near the lugs 802A, 804, for example.

Figure 11:
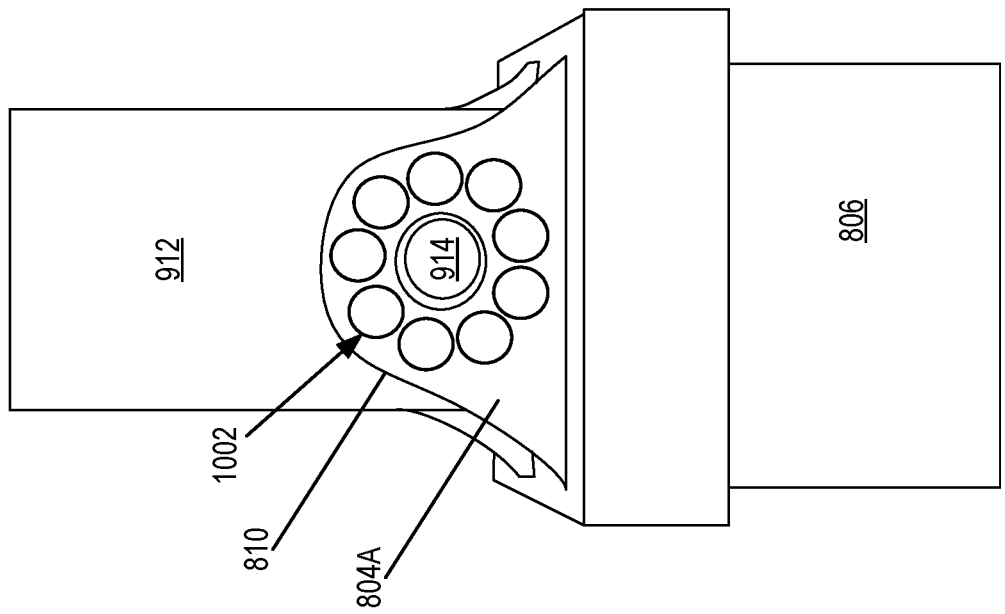
FIG. 11 shows an alternative view of the configuration of FIG. 10.

FIG. 11 shows an additional view of the example configuration of FIG. 10. In the example view of FIG. 11, the mount cover 810 is made transparent to view the heating elements/coils 1002 positioned inside/under/within the mount cover 810 around the shaft 914. The heating elements/coils 1002 provide heat to help prevent the lug 804A from freezing and/or developing cold spots that may affect its position, size, flexibility, etc.

Figure 12:
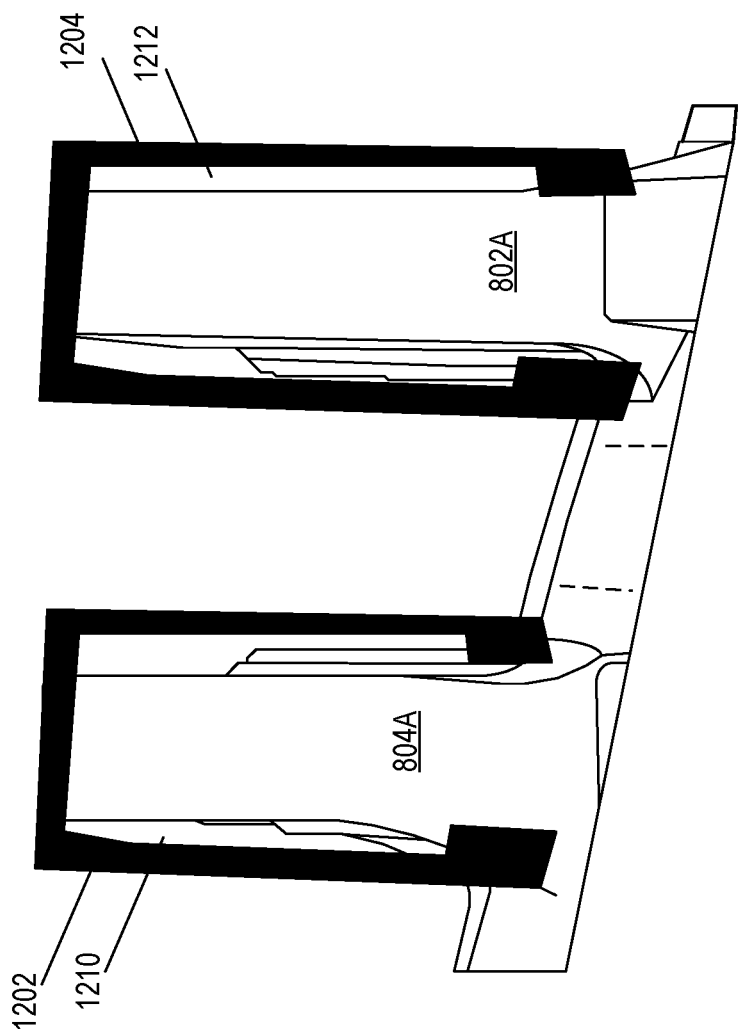
FIG. 12 illustrates an example configuration of the mount cover over lugs of FIG. 8.

FIG. 12 illustrates an alternative configuration of the mount cover 810 (labeled as 1202, 1204 in this example). In the example of FIG. 12, shown without the attachment point 912 and shaft 914, the mount cover 810 is implemented as a heat shield 1202, 1204. Each heat shield 1202, 1204 forms an air pocket 1210, 1212 around the respective lug 802A, 804A. The air pocket 1210, 1212 acts as an insulator (e.g., increasing the temperature of the lugs 802A, 804A by ~300 degrees Fahrenheit, etc.) to help prevent the lug 802A, 804A from developing cold spots, etc. The heat shield 1202, 1204 can be made of metal (e.g., pure metals, nickel alloys, chrome alloys, titanium, titanium alloys, magnesium, magnesium alloys, aluminum, aluminum alloys, and nickel or cobalt based superalloys, etc.) and press fit at the base (e.g., the flange base) around the respective lug 802A, 804A, for example.

Figure 13:
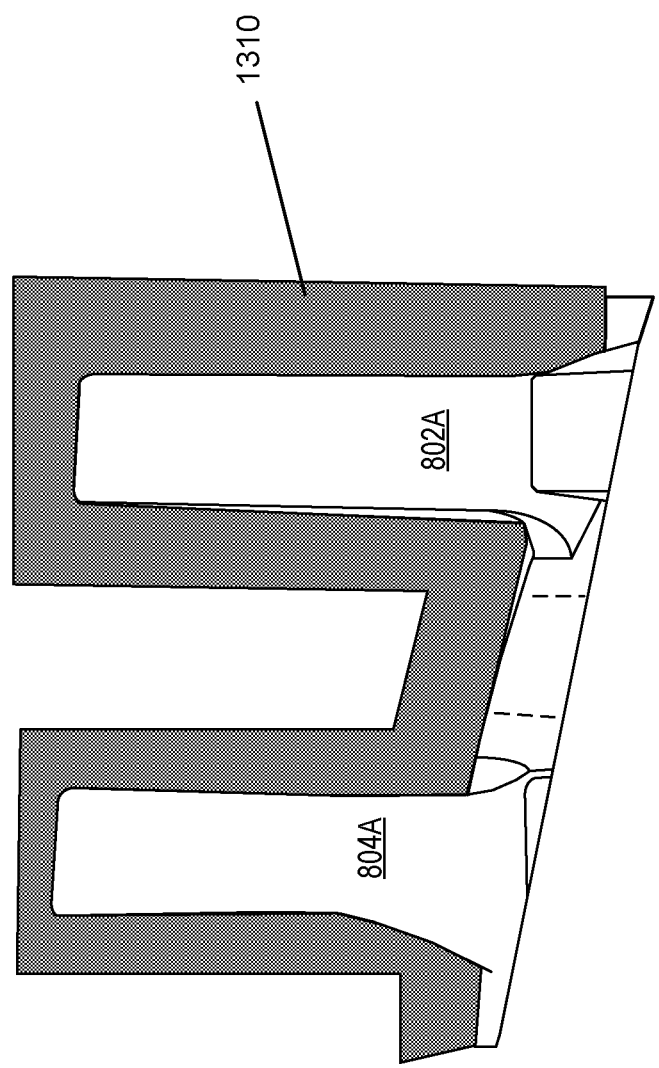
FIG. 13 illustrates an example configuration of the mount cover over lugs of FIG. 8.

FIG. 13 illustrates an alternative configuration of the mount cover 810. In the example of FIG. 13, shown without the attachment point 912 and shaft 914, the mount cover 810 is implemented as insulator packaging 1310. The insulator packaging 1310 covers the pair of lugs 802A, 804A. The attachment point 912 can be positioned between the lugs 802A, 804A and a portion of the insulator packaging 1310 covering each lug 802A, 802B. The insulator packaging 1310 acts as an insulator to help prevent the lug 802A, 804A from developing cold spots, etc. While the insulator packaging 1310 shown in the example of FIG. 13 extends between the lugs 802A, 804, in certain examples, the insulator packaging 1310 is formed such that the insulator packaging 1310 does not extend to a portion of the frame 806 between the lugs 802A, 804A.

In certain examples, the insulator packaging 1310 is implemented as a single layer of insulating material (e.g., a foam, a dielectric fluid, polystyrene, polyurethane, fiberglass, etc.). The insulator packaging 1310 helps to maintain a temperature of the set of lugs 802A, 804A during flight, for example. In some examples, the insulator packaging 1310 reduces the likelihood of temperature fluctuation (e.g., decrease) during use of an aircraft. Avoiding such temperature fluctuation (e.g., localized decrease in temperature or "cold spots") helps reduce a rotor-to-stator centerline vertical shift, for example.

Figure 14:
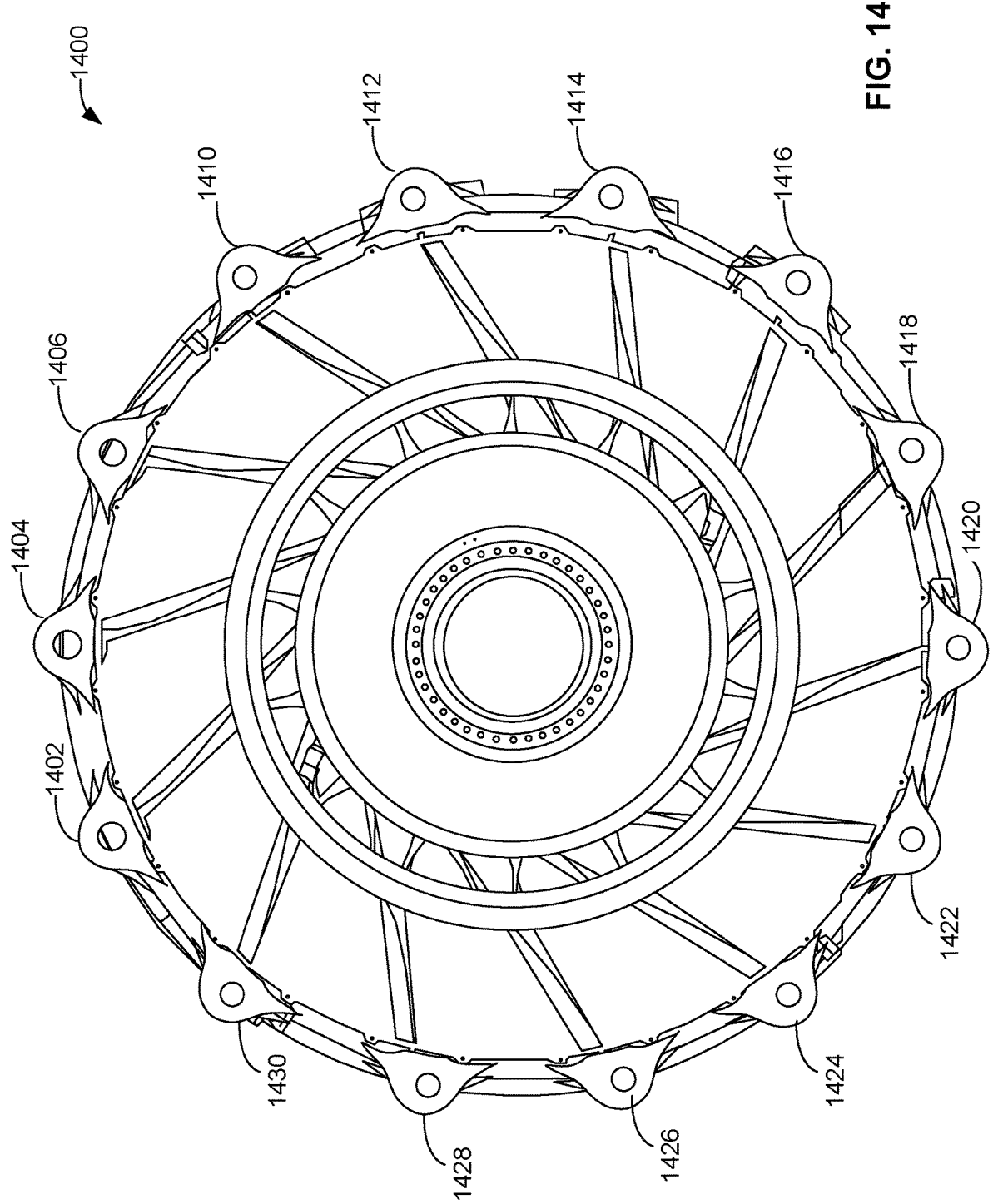
FIG. 14 illustrates a configuration of mounting lugs surrounded by a plurality of pseudo lugs on a frame.

FIG. 14 provides another approach to reducing or preventing effects of cold spots on and/or around the lugs of the frame. An example configuration 1400 of lugs 1402-1406 can be used alternatively or in addition to the mount cover 810, including heat shields 1202-1204, and insulator packaging 1310 described above with respect to FIGS. 8-13.

As described above, cold spots can result in distortion of the frame (e.g., the turbine rear frame such as the frame 806 (FIGS. 8-13), etc.). In the example of FIG. 14, three mounting lugs or links 1402, 1404, 1406 are surrounded by a plurality of pseudo lugs 1410-1430, which do not connect to anything but, instead, serve to generate a uniform distribution of cold spots. The pseudo lugs 1410-1430 generate cyclic symmetric thermal gradients, which reduce or eliminate relative rotor-stator centerline shift. Due to the uniform distribution of cold spots about the mounting lugs 1402-1406 and the pseudo lugs 1410-1430, distortion is attenuated within an axial length of the frame.

As such, FIGS. 8-14 show certain examples that provide improved seal and tip clearances through improved management of temperature on and/or around lugs 802A, 804A connecting the frame 806 to an aircraft (e.g., an aircraft component such as a pylon, etc.). A heating mechanism can be defined by one or more of the mount cover 810 with passage 812, heating coils and/or other heating elements 1002-1004, heat shield 1202-1204 with air pocket 1210-1212, insulator packaging 1310, etc. While cold spots formed on the lugs 802A, 804A and/or the frame 806 lead to a relative shift in the rotor-stator centerline, which negatively affects flowpath alignment, certain examples reduce thermal gradient between the lugs 802A, 804A and the frame 806 (e.g., by reducing or eliminating cold spots) to improve flowpath alignment of the frame 806. Additionally, while cold spots formed on the lugs 802A, 804A and/or the frame 806 can reduce seal and blade tip shroud clearance, certain examples reduce or eliminate such cold spots to improve seal and tip clearances. Certain examples improve specific fuel consumption by maintaining alignment through reduction or elimination of cold spots with respect to the lugs 802A, 804A and/or the frame 806. In certain examples, the lugs 802A, 804A can be manufactured and/or assembled including one or more of the cold spot mitigations described above. Alternatively or additionally, one or more of the mitigation configurations can be retrofit on existing lugs 802A, 804A to improve (e.g., reduce) thermal gradient and maintain flowpath alignment, for example.

Figure 15:
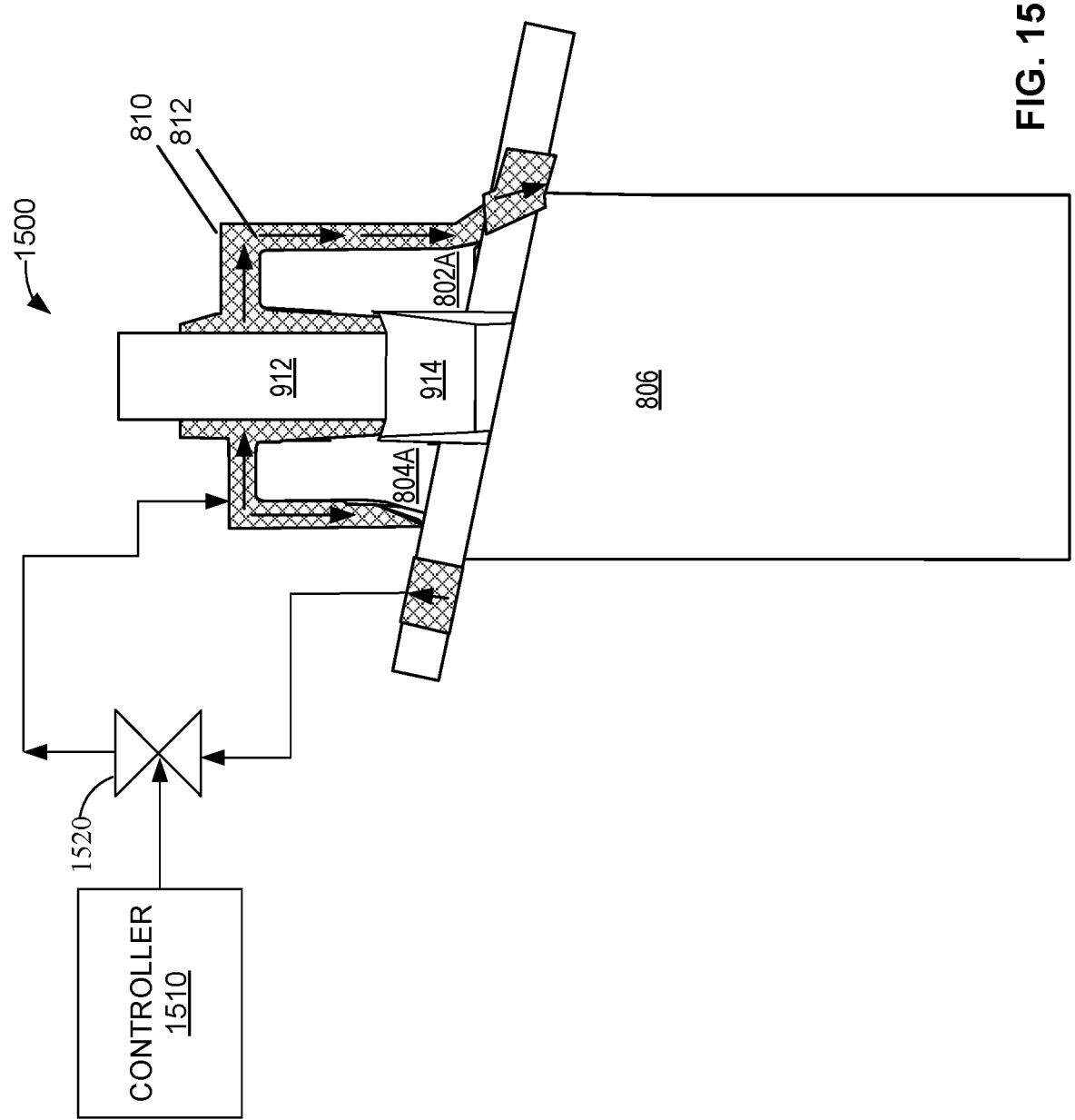
FIG. 15 illustrates an example system including a controller which controls a valve to regulate airflow under the mount cover over the lugs.

FIG. 15 illustrates an example system 1500 including a controller 1510 which controls a valve 1520 to regulate airflow under the mount cover 810 over the lugs 802A, 804A. The example controller 1510 executes control logic to adjust a position of the valve 1520. The valve 1520 regulates a flow of air through the passage 812 formed by the mount cover 810 with respect to the lugs 802A, 804A, for example. Based on a cycle condition associated with an engine mission (e.g., a flight, a trip, etc.), a temperature can be determined by the controller 1510. For example, an actual lug 802A, 804A temperature can be measured by one or more sensors 1530 and/or an estimated lug 802A, 804A temperature can be predicted by the controller 1510 based on the mission, configuration, etc. Based on the mission and temperature, the controller 1510 can determine a heating requirement which reduces or eliminates hot spots with respect to the lugs 802A, 804A, associated frame 806, etc. The heating requirement can be an air flow, an electric power, etc. As such, the controller 1510 can control the valve 1520 to regulate air flow to the mount cover 810 based on engine mission, temperature, etc.

Figure 16:
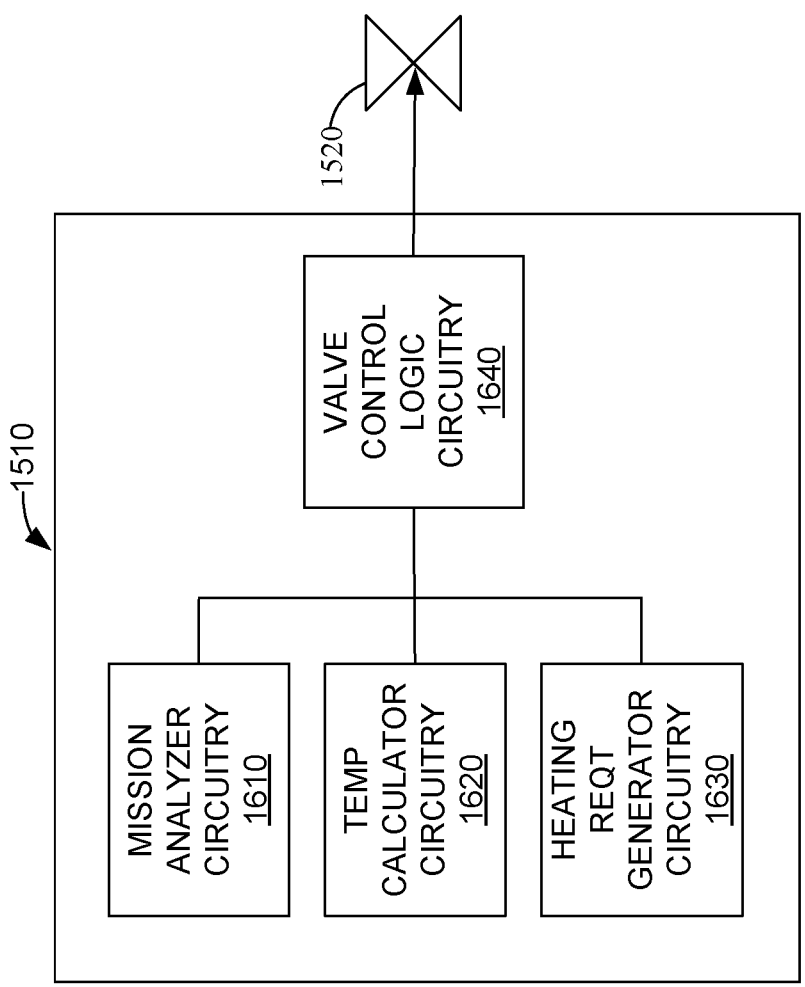
FIG. 16 illustrates an example implementation of the controller of FIG. 15.

As shown in the example of FIG. 16, the controller 1510 can be implemented using mission analyzer circuitry 1610, temperature calculator circuitry 1620, heating requirement generator circuitry 1630, and valve control logic circuitry 1640. The example mission analyzer circuitry 1610 analyzes a flight path and/or other constrain, for example, to determine under which conditions the engine is to operate. Information can include flight distance, range, altitude, region, etc.

The example temperature calculator circuitry 1620 can measure lug 802A, 804A (FIGS. 8-13) temperature from one or more sensors 1530 (FIG. 15) and/or can model/predict the temperature using data from the mission analyzer circuitry 1610, historical data, modeled data, etc. In certain examples, future temperature can be extrapolated by the temperature calculator circuitry 1620 from a current measured temperature. In some examples, a current measured temperature can be compared to a reference and/or predicted temperature by the temperature calculator circuitry 1620.

The example heating requirement generator circuitry 1630 can determine a heating requirement and/other heating criterion for the lugs 802A, 804A (FIGS. 8-13) based on the temperature and mission information. Air flow, electric power for heating elements, etc., is determined by the heating requirement generator circuitry 1630 based on mission conditions, other operating conditions, etc.

The example valve control logic circuitry 1640 sends a signal to operate the valve 1520 based on the determined air flow, etc., from the heating requirement generator circuitry 1630. For example, the valve control logic circuitry 1640 opens the valve 1520 to a varying degree based on a desired air flow into the mount cover 810 (FIGS. 8-13) (e.g., 10% open, 25% open, 33% open, 50% open, 67% open, 75% open, 80% open, 100% open, etc.). As such, more or less heating air flow can be allowed over the lugs 802A, 804A (FIGS. 8-13) within the passage formed between the mount cover 810 and the lugs 802A, 804A, for example. Alternatively or additionally, the valve 1520 can be an electrical valve which is controlled by the valve control logic circuitry 1640 to provide more or less current to heat the heating elements 1002, 1004 FIGS. 10 and 11) to a desired/set degree.

In some examples, the apparatus includes a means for attaching a frame to an aircraft. For example, the means for attaching can be implemented by the example lugs 802A, 804A, etc. In some examples, the apparatus includes a means for covering the means for attaching. For example, the means for covering can be implemented by the example mount cover 810, heat shield 1202-1204, etc. In some examples, the apparatus includes a means for heating to regulate a temperature of at least one of: i) the means for attaching; or ii) around the means for attaching, under the means for covering. For example, the means for heating can be implemented by a heating mechanism such as the example airflow 924 through the passage 920-922 (FIG. 9), heating elements 1002-1004 (FIGS. 10 and 11), air pockets 1210-1212 (FIG. 12), insulator packaging 1310 (FIG. 13), pseudo lugs 1410-1430 (FIG. 14), and/or the example valve 1520 (FIGS. 15 and 16), etc. In some examples, the apparatus includes a means for controlling the means for heating. For example, the means for controlling can be implemented by the example controller 1510, the example valve 1520, the example sensor 1530, etc.

While an example implementation of the controller 1510 of FIG. 15 is illustrated in FIG. 16, one or more of the elements, processes, and/or devices illustrated in FIG. 16 may be combined, divided, re-arranged, omitted, eliminated, and/or implemented in any other way. Further, the example mission analyzer circuitry 1610, the example temperature calculator circuitry 1620, the example heating requirement generator circuitry 1630, the example valve control logic circuitry 1640, and/or, more generally, the example controller 1510 of FIG. 16, may be implemented by hardware alone or by hardware in combination with software and/or firmware. Thus, for example, any of the example mission analyzer circuitry 1610, the example temperature calculator circuitry 1620, the example heating requirement generator circuitry 1630, the example valve control logic circuitry 1640, and/or, more generally, the example controller 1510, can be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controller 1510 of FIG. 15 may include one or more elements, processes, and/or devices in addition to, or instead of, those illustrated in FIG. 16, and/or may include more than one of any or all of the illustrated elements, processes, and devices.

Figure 17:
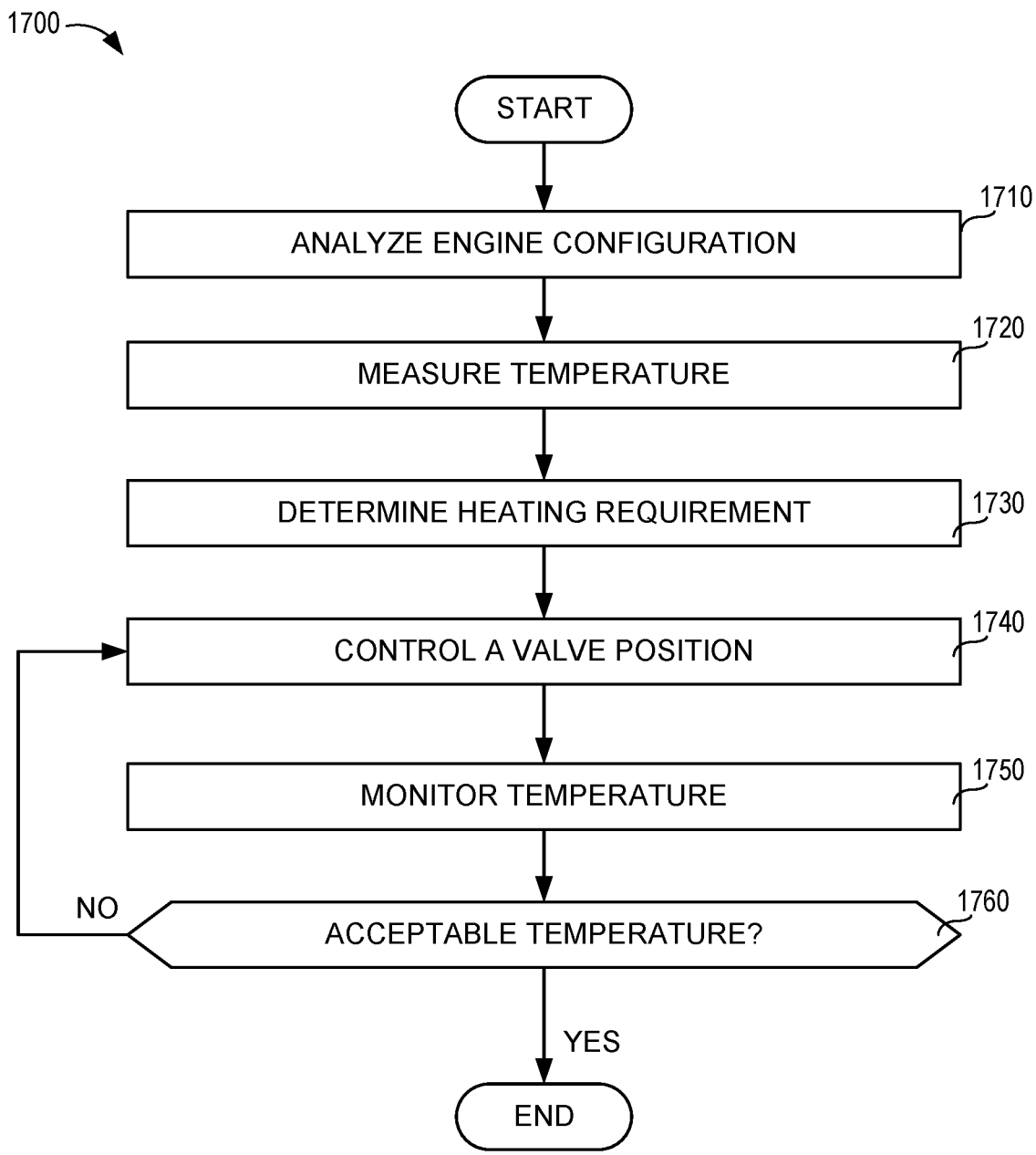
FIG. 17 illustrates an example method for regulating heat with respect to lugs of a turbine frame.

A flowchart representative of example hardware logic circuitry, machine readable instructions, hardware implemented state machines, and/or any combination thereof for implementing the apparatus 1510 of FIG. 16 is shown in FIG. 17. The machine readable instructions may be one or more executable programs or portion(s) of an executable program for execution by processor circuitry, such as the processor circuitry 1812 shown in the example processor platform 1800 discussed below in connection with FIG. 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 17, many other methods of implementing the example controller 1510 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 17 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

FIG. 17 illustrates an example method 1700 for regulating heat with respect to lugs 802A, 804A of a turbine frame 806 (FIG. 8-13). At block 1710, if present, an engine configuration or plan (e.g., a "mission") is analyzed to predict and/or otherwise determine expected conditions along an associated flight path. For example, based on weather, altitude, speed, etc., associated with the flight path for the mission, expected conditions (e.g., temperature, etc.) can be predicted by a model, algorithm, logic circuitry, etc. (e.g., by the mission analyzer circuitry 1610 (FIG. 16)).

At block 1720, a temperature is measured (e.g., using one or more temperature sensors) to determine a temperature of the lugs 802A, 804A and/or the frame 806, etc. For example, the temperature calculator circuitry 1620 (FIG. 16) processes temperature readings obtained by one or more sensors to determine lug and/or frame temperature.

At block 1730, a heating criterion and/or other heating requirement is determined based on the measured temperature. For example, the heating requirement generator circuitry 1630 (FIG. 16) evaluates the measured lug and/or frame temperature with respect to one or more temperature thresholds, ranges, warnings, etc., to determine a degree to which the lugs 802A, 804A are to be heated to avoid cold spots and associated distortion of the flow path and engine alignment.

At block 1740, the valve 1520 (FIG. 16) is controlled according to the heating criterion/requirement. For example, the valve control logic circuitry 1640 (FIG. 16) controls the valve 1520 to provide a certain air flow into the passage formed by the mount cover 810 over the lugs 802A, 804A. Alternatively or additionally, the valve control logic circuitry 1640 controls the valve 1520 to produce a specified current to the heating elements 1002, 1004 (FIGS. 10 and 11) to warm the lugs 802A, 804A, for example.

At block 1750, temperature of and/or around the lugs 802A, 804A is monitored by one or more sensors, such as the sensor 1530 (FIG. 15). At block 1760, if the temperature is within an acceptable and/or other predetermined range, then the example method 1700 can revert to the beginning and/or otherwise end. However, if the temperature is not acceptable, then the process continues to control the valve position at block 1740. In other examples, the method 1700 operates continuously while the engine is in operation (e.g., while the aircraft is in flight).

As such, certain examples provide a mechanism to improve heat control around lugs of an engine frame, such as a turbine rear frame, etc. Certain examples enable regulation of temperature around the lugs to reduce or eliminate cold spots, which can distort alignment and result in reduced specific fuel consumption, reduced engine performance, and increased stress on the engine. Certain examples provide a controller to regulate a heating air flow and/or electric current to heating elements to manage lug temperature.

Figure 18:
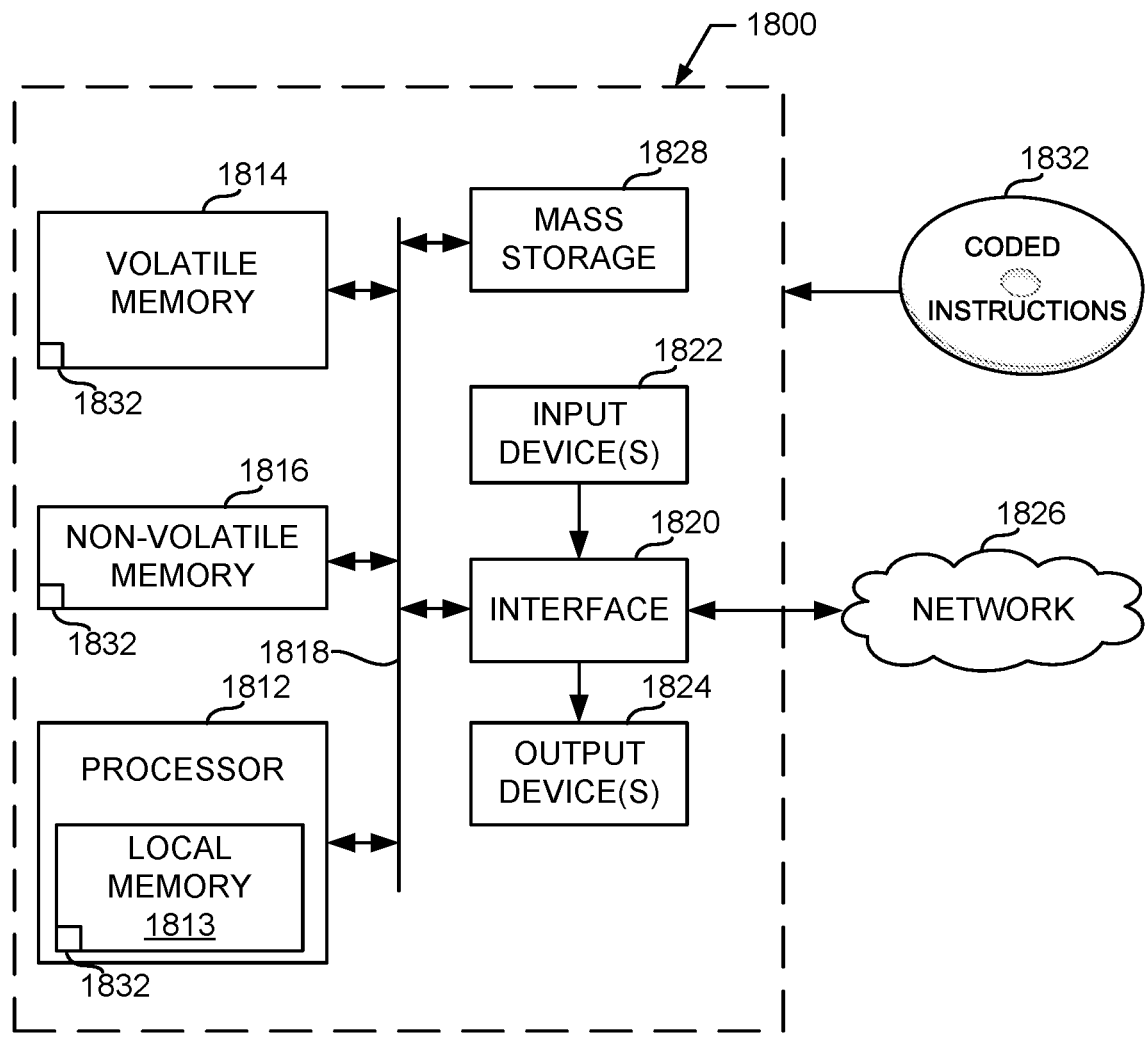
FIG. 18 is a block diagram of an example processor platform structured to execute and/or instantiate the machine readable instructions and/or the operations of FIG. 17 to implement the apparatus of FIG. 16.

FIG. 18 is a block diagram of an example processor platform 1800 structured to execute and/or instantiate the machine readable instructions and/or the operations of FIG. 17 to implement the apparatus of FIGS. 15-16. The processor platform 1800 can be, for example, a microprocessor, an embedded controller, or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs, microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements all or part of the example controller 1510 (FIG. 15).

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device.

The processor platform 1800 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, a sensor, a keypad, a button, a touchscreen, a thermometer, etc.

One or more output devices 1824 are also connected to the interface circuitry 1820 of the illustrated example. The output device(s) 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

In some examples, the interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, redundant array of independent disks (RAID) systems, solid state storage devices such as flash memory devices and/or SSDs, etc.

The machine executable instructions 1832, which may correspond to the machine readable instructions of FIG. 17, may be stored in the mass storage device 1828, in the volatile memory 1814, in the non-volatile memory 1816, and/or on a removable non-transitory computer readable storage medium such as a USB drive, etc.

From the foregoing, it will be appreciated that example systems, methods, apparatus, and articles of manufacture have been disclosed that improve the stability of the engine frame by regulating temperature of and/or around the lugs on an engine frame. Disclosed systems, methods, apparatus, and articles of manufacture improve temperature stability and regulation through covering and modulating lug temperature on an engine frame.

Further aspects of the present disclosure are provided by the subject matter of the following clauses:

An engine apparatus including: a frame; a lug to attach the frame to an aircraft; a mount cover positioned over the lug; and a heating mechanism to regulate a temperature of the lug under the mount cover.

The engine apparatus of any preceding clause, wherein the heating mechanism includes a plurality of heating coils.

The engine apparatus of any preceding clause, wherein the heating mechanism includes a valve to route air through a passage formed between the mount cover and the lug.

The engine apparatus of any preceding clause, wherein the valve is controlled by a controller.

The engine apparatus of any preceding clause, wherein the controller includes a mission analyzer, a temperature calculator, a heating requirement generator, and valve control logic.

The engine apparatus of any preceding clause, wherein the mount cover is a metal heat shield.

The engine apparatus of any preceding clause, wherein the mount cover is formed of insulator packaging around the lug.

The engine apparatus of any preceding clause, further including a plurality of lugs, wherein the mount cover is at least one mount cover covering the plurality of lugs.

The engine apparatus of any preceding clause, further including a plurality of pseudo lugs arranged with respect to the lug on a circumference of the frame.

A heating apparatus including: a mount cover positioned over a lug on an engine frame; and a heating mechanism to regulate a temperature of the lug under the mount cover.

The heating apparatus of any preceding clause, wherein the heating mechanism includes a plurality of heating coils.

The heating apparatus of any preceding clause, wherein the heating mechanism includes a valve to route air through a passage formed by the mount cover with respect to the lug.

The heating apparatus of any preceding clause, further including a controller, and wherein the valve is controlled by the controller.

The heating apparatus of any preceding clause, wherein the controller includes a mission analyzer, a temperature calculator, a heating requirement generator, and valve control logic.

The heating apparatus of any preceding clause, wherein the mount cover is a metal heat shield.

The heating apparatus of any preceding clause, wherein the mount cover is formed of insulator packaging around the lug.

The heating apparatus of any preceding clause, wherein the mount cover is to cover a plurality of lugs.

The heating apparatus of any preceding clause, further including a plurality of pseudo lugs arranged with respect to the lug on a circumference of the engine frame.

An apparatus including: a means for attaching a frame to an aircraft; a means for covering the means for attaching; and a means for heating to regulate a temperature at least one of: i) of the means for attaching or ii) around the means for attaching under the means for covering.

The apparatus of any preceding clause, further including a means for controlling the means for heating.

A controller to regulate lug temperature including processor circuitry and memory circuitry to determine a heating criterion for lugs based on a determined temperature and a target temperature threshold and to control a valve position to enable heating of the lugs based on the heating criterion.

A controller of any preceding clause, further including one or more sensors to measure and/or monitor lug temperature.

A method to regulate lug temperature including determining a heating criterion for lugs based on a determined temperature and a target temperature threshold; and controlling a valve position to enable heating of the lugs based on the heating criterion.

The method of any preceding clause, further including measuring lug temperature.

The method of any preceding clause, further including monitoring lug temperature.

The method of any preceding clause, further including determining the target temperature threshold.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An engine apparatus comprising:
    a turbine frame;
    a lug to attach the turbine frame to an aircraft;
    a mount cover positioned over the lug, a curvature of the mount cover matching a curvature of the lug; and
    a heating mechanism to regulate a temperature of the lug under the mount cover.

2. The engine apparatus of claim 1, wherein the heating mechanism includes a plurality of heating coils.

3. The engine apparatus of claim 1, wherein the heating mechanism includes a valve to route air through a passage formed between the mount cover and the lug.

4. The engine apparatus of claim 3, wherein the valve is controlled by a controller.

5. The engine apparatus of claim 4, wherein the controller includes mission analyzer circuitry, temperature calculator circuitry, heating requirement generator circuitry, and valve control logic circuitry.

6. The engine apparatus of claim 1, wherein the mount cover is a metal heat shield.

7. The engine apparatus of claim 1, wherein the mount cover is formed of insulator packaging around the lug.

8. The engine apparatus of claim 1, further including a plurality of lugs, wherein the mount cover is at least one mount cover covering the plurality of lugs.

9. The engine apparatus of claim 1, further including a plurality of pseudo lugs arranged with respect to the lug on a circumference of the frame.

10. A heating apparatus comprising:
    a mount cover positioned over a lug on an engine frame, a curvature of the mount cover following a curvature of the lug;
    a plurality of pseudo lugs arranged with respect to the lug on a circumference of the engine frame; and
    a heating mechanism to regulate a temperature of the lug under the mount cover.

11. An apparatus comprising:
    a means for attaching a frame to an aircraft;
    a means for covering the means for attaching, a curvature of the means for covering matching a curvature of the means for attaching; and
    a means for heating to regulate a temperature of at least one of: i) the means for attaching; or ii) around the means for attaching, under the means for covering.

12. The apparatus of claim 11, further including a means for controlling the means for heating.

* * * * *